2,904,385

DYEING ANIMAL FIBRES AND COMPOSITIONS THEREFOR

Roger Charle, Soisy-sous-Montmorency, and Robert Lazare Lantz, Paris, France, assignors to Société Anonyme dite Societe Monsavon-L'Oreal, Paris, France, a corporation of France No Drawing. Application July 15, 1957
Serial No. 671,806

Claims priority, application France July 17, 1956

15 Claims. (Cl. 8—10)

This invention relates to processes for dyeing animal fibres, including live hair on the human head, and to compositions for use in such processes.

According to the present invention a process for dyeing animal fibres comprises subjecting the fibres to treatment with an aqueous solution, at pH 7 to 11, of a reduction product of an azo dye containing in its molecule at least one disulphide group. It is believed that in said reduction products the disulphide groups are reduced to sulphydryl groups. The dyes employed may contain other groups commonly present in azo dyes, e.g. halogen atoms, or alkyl, hydroxyalkyl, amino, carboxylic or sulphonic groups.

In the preferred process of the invention the animal fibres are subjected to treatment with an aqueous solution, at pH 7 to 11, containing an azo dye having in its molecule at least one disulphide group, and a reducing agent.

The reducing agents employed in the dye bath naturally must not have any deleterious action on the fibre to be dyed. It has been found that reducing mercaptans are particularly suitable, e.g. aliphatic mercaptocarboxylic acids, such as thioglycolic acid and thiolactic acid, but other reducing agents, e.g. hydrosulphite, sulphite, thiourea dioxide or alkali borohydride may also be employed.

The pH of the dye bath (7 to 11) is such as not to damage the fibre. Suitable and preferred alkaline compounds for the bath, to achieve this pH range, are ammonia, organic bases such as ethanolamines and salts of weak acids, such as those of carboxylic acids, or of boric acid.

The dyeing may be carried out in free-flowing aqueous medium but where it is desired to thicken the dye liquid, one or more products capable of transforming it into a gel or cream may be included.

Additives usual in the dyeing of animal fibres may also be present in the dyeing composition, for example mineral salts, surface-active products or substances having dissolving or dispersing properties for the dye or swelling properties for the fibre, e.g. mono- or polyalcohols, ether alcohols, ketones and urea.

After dyeing, the fibre can be treated by any process known per se for use in dyeing operations. Thus, in some cases, it is desirable to subject it to an oxidising treatment. This treatment may be carried out, for example, with hydrogen peroxide, a per compound such as sodium perborate or ammonium persulphate or simply by the action of atmospheric oxygen. Oxidation catalysts may be employed at the same time. After the dyeing and, if desired, oxidation, one or more of the treatments usual in the dyeing industry, such as a treatment with salts or complexes of heavy metals or with organic products capable of increasing the fastness of the dyes to aqueous treatment may be carried out, and any of the usual finishing operations, such as washing and treatment with solutions of surface-active substances.

Animal fibres which can be dyed in accordance with the present invention are wool, feathers, bristles, furs, hair, and more particularly live hair. The dyeing may be carried out at a temperature lower than 50° C., and even at room temperature, which is very advantageous for materials which cannot be treated at high temperature, such as furs or live hair.

A number of dyes which can be used for carrying out the process according to the invention are known from French Patents Nos. 712,561 and 713,284. They can be prepared by coupling a diazo compound with a coupling component, these two reactants being so chosen that the molecule of at least one of them is substituted by one or more disulphide groups. Such dyes may also be obtained by the process described in French Patent No. 1,043,773, which consists in transforming the sulphonic groups of acid dyes into disulphide groups. Dyes not previously described are employed in the examples of the present invention which follow and were prepared by the processes of the aforesaid patents. The invention includes the use of the dyes specified irrespective of their method of preparation.

Dyes containing disulphide or thiophenol groups have already been employed for dyeing, but only for dyeing vegetable fibres or regenerated, etherified or esterified cellulose (see in particular French Patent No. 713,284). It was impossible to foresee that they would dye animal fibres or other nitrogeneous fibres; their affinity for these fibres being neither known nor foreseeable. Moreover, the dyeing conditions usually employed for cellulosic fibres are not suitable for the majority of animal fibres, the dyeing of which forms the subject of the present invention, and notably in the dyeing of keratinous fibres the use of sodium sulphide must be avoided.

Also included in the present invention are dyeing compositions suitable for carrying out the process of the invention and which comprise, in aqueous solution, at least one azo dye, the molecule of which possesses a disulphide group and a reducing agent. The composition may be in the form of a free flowing liquid of concentration at pH ready for use or may contain thickening agents, and in either case may contain any of the usual dye-bath additives. Alternatively it may be in the form of a powder ready to be dissolved in water immediately before use, or in the form of a powder, free from the alkaline compound and intended to be dissolved in an alkaline medium to produce the composition in condition for use. Further, the composition according to the invention may be in the form of a cream, either ready to be dissolved in water and containing a dye of the aforesaid type, a reducing agent, an alkaline substance and a thickening agent or, without the alkaline substance, ready to be dissolved in an alkaline aqueous medium.

The following examples will serve to illustrate the invention. Chemical formulae of the dyes are set out in the accompanying drawing.

EXAMPLE I

There is prepared a solution containing:

1.5 g. of the azo dye resulting from the coupling of a molecule of the tetrazo compound of 4-4'-diamino-diphenyl-disulphide, for example in the form of its chloride

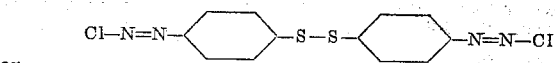

with 2 molecules of meta-phenylene-diamine,
1 g. of ammonium thioglycolate,
6.5 g. of 20% ammonia, and
The quantity of water necessary to make 100 cc. of solution.

A specimen of white hair is dipped therein for 20 minutes at room temperature. After rinsing with water, this specimen is found to be dyed a brownish orange shade, which is fast to rubbing and to shampooing. The shade changes to orange on treatment with dilute hydrogen peroxide solution (0.3 vol.).

If the aforesaid dye is replaced by equimolecular quantities of other dyes, the shades indicated in the following Tables I, II and III are obtained:

monium thiolactate. There may also be employed, as the reducing agent, per 1.5 g. of the dye described in Example I or per an equimolecular quantity of another dye:

0.6 g. of formamidinesulphinic acid, or
0.6 g. of sodium hydrosulphite, or
1 g. of sodium borohydride.

*Table I*

| Azo dye resulting from the coupling of the tetrazo compound of 4-4′-diaminodiphenyldisulphide with two molecules of— | Shade of the dye obtained on white hair | |
|---|---|---|
| | (a) directly | (b) after oxidation by $H_2O_2$ |
| beta-naphthol | brownish red | orange red. |
| alpha-naphthol | orange-yellow-brownish. | brownish orange. |
| 2-phenylamino-8-naphthol-6-sulphonic acid, called "phenyl-gamma" acid (coupling in alkaline medium). | violet brown | more violet brown than for (a). |
| "phenyl-gamma acid" (coupling in acid medium) | dull lilac | dull lilac. |
| 2-hydroxy naphthalene-6-sulphonic acid | pink | pink. |
| alpha-naphthylamine | brownish orange. | orange. |
| beta-naphthylamine | orange-yellow | orange-yellow. |

*Table II*

| Azo dye resulting from the coupling of the tetrazo compound of 3-3′-dimethoxy-4-4′-diamino-diphenyldisulphide (for example in the form of chloride) $Cl-N=N-\langle OCH_3\rangle-S-S-\langle CH_3O\rangle-N=N-Cl$ with two molecules of— | Shade of the dye obtained on white hair | |
|---|---|---|
| | (a) directly | (b) after oxidation with $H_2O_2$ |
| beta-naphthol | bluish-pink | pink. |
| "Phenyl-gamma acid" (coupling in alkaline medium) | violet-brown | violet-brown. |
| meta-phenylenediamine | brownish-orange | orange. |

Under the same conditions, the dyes of the above table, applied for four hours at 40° C., give on white rabbit fur, if desired mordanted with alumina, iron or chromium, shades similar to those obtained on white hair.

The ammonium thioglycolate indicated in Example I may be replaced by an equimolecular quantity of am-

EXAMPLE II 1.5 g. of the azo dye resulting from the coupling of one molecule of the tetrazo compound of 4-4′-diamino-diphenyldisulphide with two molecules of 1-5-dihydroxy-naphthalene is dissolved in 14 cc. of 20% ammonia.

*Table III*

| | Shades of the dye obtained on white hair | |
|---|---|---|
| | (a) directly | (b) after oxidation with $H_2O_2$ |
| Azo dye resulting from the coupling of the tetrazo compound of 4-4′- diamino-diphenyldisulphide with a molecule of 4-4′-bis (2-hydroxynaphthane-3-carboxylamido) diphenyldisulphide. | bluish-pink | pink. |
| Azo dye resulting from the coupling of the tetrazo compound of 3-3′-dimethoxy-4-4′-diamino-diphenyldisulphide with a molecule of the dye of Formula V. | reddish-violet | bluish-pink. |

There are then added 900 cc. of water, and 1 g. of ammonium thioglycolate.

40 g. of wool are immersed in this solution for three hours at room temperature.

After rinsing with water, the wool has a reddish-violet shade fast to rubbing and to washing.

An equal weight of white rabbit fur may also be dyed in the solution prepared as above.

By using a solution prepared as in the foregoing example, but containing only 90 cc. of water instead of 900 cc. of water, white hair is dyed by treatment for 5 minutes at room temperature, directly with a bluish-pink shade which changes to pink after oxidation with $H_2O_2$.

EXAMPLE III 1.5 g. of the azo dye resulting from the coupling of one molecule of the tetrazo compound of 3-3'-dimethoxy-4-4'-diamino-diphenyldisulphide with 2 molecules of metaphenylene-diamine is dissolved in 14 cc. of 20% ammonia. There are then added 1 g. of ammonium thioglycolate, and 900 cc. of water.

40 g. of white rabbit fur are immersed in this solution for three hours at room temperature.

After rinsing with water, the rabbit fur has a bright orange shade which is fast to rubbing and washing.

The rabbit fur may also be previously mordanted with iron, chromium or aluminium. In this case, similar shades are obtained.

Wool may also be dyed under the same conditions in the solution prepared as above. A bright orange shade is obtained.

We claim:

1. A process for dyeing animal fibres which comprises subjecting the fibres to treatment with an aqueous solution, at pH 7 to 11, of a reduction product of an azo dye containing in its molecule at least one disulphide group.

2. Process for dyeing animal fibres which comprises treating the animal fibres with an aqueous solution at pH 7 to 11 containing at least one azo dye having in its molecule at least one disulphide group, and a reducing agent selected from the group consisting of lower aliphatic mercapto carboxylic acids, alkali metal hydro-sulphites, sulphites, boro-hydrides and thiourea dioxide.

3. Process for dyeing animal fibres which comprises treating the animal fibres with an aqueous solution at pH 7 to 11 containing at least one azo dye having in its molecule at least one disulphide group, and, as a reducing agent an aliphatic mercaptan.

4. A process for dyeing animal fibres which comprises subjecting the fibres at room temperature to treatment with an aqueous solution, at pH 7 to 11, of a reduction product of an azo dye containing in its molecule at least one disulphide group.

5. Process for dyeing animal fibres which comprises treating the animal fibres with an aqueous solution containing at least one azo dye, having in its molecule at least one disulphide group, a reducing agent selected from the group consisting of lower aliphatic mercapto carboxylic acids, alkali metal hydro-sulphites, sulphites, boro-hydrides and thiourea dioxide, and sufficient of a nitrogenous base to bring the pH value of the solution to within the range 7 to 11.

6. A dyeing composition for dyeing animal fibres comprising at least one azo dye having in its molecule at least one disulphide group, and a reducing agent selected from the group consisting of lower aliphatic mercapto carboxylic acids, alkali metal hydro-sulphites, sulphites, boro-hydrides and thiourea dioxide.

7. A dyeing composition for dyeing animal fibres comprising at least one azo dye having in its molecule at least one disulphide group, a reducing agent selected from the group consisting of lower aliphatic mercapto carboxylic acids, alkali metal hydro-sulphites, sulphites, boro-hydrides and thiourea dioxide and an alkaline material.

8. A dyeing composition for dyeing animal fibres consisting of a mixture in powder form of at least one azo dye having in its molecule at least one disulphide group, a reducing agent selected from the group consisting of lower aliphatic mercapto carboxylic acids, alkali metal hydro-sulphites, sulphites, boro-hydrides and thiourea dioxide and an alkaline substance.

9. A dyeing composition for dyeing animal fibres consisting of a mixture in powder form of at least one azo dye having in its molecule at least one disulphide group and a reducing agent selected from the group consisting of lower aliphatic mercapto carboxylic acids, alkali metal hydro-sulphites, sulphites, boro-hydrides and thiourea dioxide.

10. A dyeing composition for dyeing animal fibres comprising at least one azo dye having in its molecule at least one disulphide group, a reducing agent selected from the group consisting of lower aliphatic mercapto carboxylic acids, alkali metal hydro-sulphites, sulphites, boro-hydrides and thiourea dioxide, an alkaline substance and a thickening agent all in aqueous solution at pH 7–11.

11. A dyeing composition according to claim 7, containing in addition a wetting agent and a swelling agent for the fibre to be dyed.

12. A dyeing composition for dyeing animal fibres comprising at least one azo dye having in its molecule at least one disulphide group, and a reducing agent selected from the group consisting of lower aliphatic mercapto carboxylic acids, alkali metal hydro-sulphites, sulphites, boro-hydrides and thiourea dioxide, the composition being in the form of an aqueous cream.

13. A dyeing composition for dyeing animal fibres comprising at least one azo dye having in its molecule at least one disulphide group, a reducing agent selected from the group consisting of lower aliphatic mercapto carboxylic acids, alkali metal hydro-sulphites, sulphites, boro-hydrides and thiourea dioxide and an alkaline material, the composition being in the form of an aqueous cream.

14. A process for dyeing animal fibres which comprises treating the animal fibres with an aqueous solution at pH 7 to 11 containing at least one azo dye having in its molecule at least one disulphide group, and as a reducing agent thioglycolic acid.

15. A process for dyeing animal fibres which comprises treating the animal fibres with an aqueous solution at pH 7 to 11 containing at least one azo dye having in its molecule at least one disulphide group, and as a reducing agent thiolactic acid.

References Cited in the file of this patent

UNITED STATES PATENTS

| | | |
|---|---|---|
| 2,719,104 | Westerberg | Sept. 27, 1955 |
| 2,776,668 | Morgan | Jan. 8, 1957 |

FOREIGN PATENTS

| | | |
|---|---|---|
| 713,284 | France | Oct. 24, 1931 |